(12) United States Patent
Ichikawa et al.

(10) Patent No.: US 7,563,981 B2
(45) Date of Patent: Jul. 21, 2009

(54) HIGH-VOLTAGE WIRE HARNESS

(75) Inventors: Hidehiro Ichikawa, Toyota (JP);
Shigemi Hashizawa, Toyota (JP)

(73) Assignee: Yazaki Corporation, Tokyo (JP)

( * ) Notice: Subject to any disclaimer, the term of this patent is extended or adjusted under 35 U.S.C. 154(b) by 161 days.

(21) Appl. No.: 11/285,356

(22) Filed: Nov. 23, 2005

(65) Prior Publication Data

US 2006/0278423 A1 Dec. 14, 2006

(30) Foreign Application Priority Data

Nov. 26, 2004 (JP) .............................. 2004-342843

(51) Int. Cl.
*H01B 7/00* (2006.01)
*H01B 7/08* (2006.01)
*H02G 5/06* (2006.01)
*H02G 3/04* (2006.01)
*H02G 15/25* (2006.01)
*H01P 3/06* (2006.01)

(52) U.S. Cl. ............... 174/72 A; 174/21 R; 174/102 R; 174/70 C; 333/243

(58) Field of Classification Search ............... 174/72 A, 174/21 R, 24, 68.1, 68.3, 88 R, 70 C, 95, 174/96, 99 R, 102 R, 19; 333/243
See application file for complete search history.

(56) References Cited

U.S. PATENT DOCUMENTS 3,639,864 A * 2/1972 Klostermark ............... 333/243
4,891,012 A   1/1990 Pajot
5,894,536 A * 4/1999 Rifkin et al. .................. 385/99
2004/0099427 A1* 5/2004 Kihira ....................... 174/35 C

FOREIGN PATENT DOCUMENTS

| DE | 1255761       | 9/1960  |
|----|---------------|---------|
| DE | 24 48 041     | 10/1974 |
| DE | 40 13 963 C2  | 4/1990  |
| DE | 40 18 267 A1  | 6/1990  |
| DE | 41 38 714 A1  | 11/1991 |
| EP | 1 376 781 A1  | 6/2003  |
| JP | 2002-170433 A | 6/2002  |
| JP | 2003-143734 A | 5/2003  |
| JP | 2003-197037 A | 7/2003  |

* cited by examiner

*Primary Examiner*—Angel R Estrada
*Assistant Examiner*—David M Sinclair
(74) *Attorney, Agent, or Firm*—Sughrue Mion, PLLC

(57) ABSTRACT

That portion of a wire harness, corresponding to an installation path region E1 where a cable is not required to have flexibility, includes rigid wires 1 each having a single conductor 1*a*, and a metal shielding case 2 covering outer peripheries of the rigid wires 1. Each of those portions of the wire harness, corresponding respectively to installation path regions E2 where the cable is required to have flexibility, includes flexible wires 4, and a flexible shielding member 5 covering outer peripheries of the flexible wires 4. Conductors 4*a* of the flexible wires 4 are connected to the conductors 1*a* of the rigid wires 1, and the metal protector 2 is connected to the flexible shielding members 5.

4 Claims, 7 Drawing Sheets

HIGH-VOLTAGE WIRE HARNESS

BACKGROUND OF THE INVENTION

1. Field of the Invention

This invention relates to a high-voltage wire harness having a shielding performance.

2. Related Art

When a source voltage for an automobile is increased to a high level, wires of a wire harness can be reduced in diameter, and also the efficiency of use of a power source, etc., can be improved. On the other hand, it becomes necessary to take a positive measure to cope with electromagnetic noises which affect a high-voltage wire harness (used, for example, between a battery and an inverter or between a motor and an inverter).

There is one conventional high-voltage wire harness with a shielding performance in which non-shielded type wires with no shielding layer are used, and a bundle of these wires are collectively covered at an outer periphery thereof with a single shielding member (see, for example, JP-A-2003-197037).

However, the flexible shielding member (e.g., a braid formed by weaving metal wires into a tubular shape) is expensive, and this expensive shielding member need to be provided over the entire length of the wires, and therefore the high-voltage wire harness becomes very expensive.

FIGS. 5 to 7 show another high-voltage wire harness with a shielding performance. This high-voltage wire harness 50 comprises a plurality of kinds of wires W1 and W2, a grommet 51, a corrugated tube 52, a clamp 53, a resin protector 54 (these parts 51, 52, 53 and 54 are mounted respectively on suitable portions of a bundle of wires W1 and W2), and connectors 55 and LA terminals 56 which are connected respectively to opposite ends of the wires W1 and W2.

With respect to the plurality of kinds of wires W1 and W2, the wire W1 is of the non-shielded type, while the wires W2 are of the shielded type with a, shielding layer. The use of the shielded wires W2 provides a measure to cope with electromagnetic noises. As shown in FIG. 7, the shielded wire W2 comprises a conductor 60 composed of a number of fine conductor wires twisted together, an inner insulating layer 61 covering an outer periphery of the conductor 60, a shielding wire (shielding layer) 62 covering an outer periphery of the inner insulating layer 61, and an insulating sheath 63 covering an outer periphery of the shielding wire 62.

The resin protector 54 comprises a resin-made straight protector 54a (having a straight shape so that the wire harness 50 can be installed along a straight installation path), and a pair of bent protectors 54b and 54b of a bent shape connected respectively to opposite ends of the straight protector 54a.

In the conventional high-voltage wire harness 50, however, the expensive shielded wires W2 are used over the entire length of the installation path, and therefore there has been encountered a problem that the cost is very high as is the case with the first-mentioned conventional high-voltage wire harness.

SUMMARY OF THE INVENTION

Therefore, this invention has been made in order to solve the above problem, and an object of the invention is to provide a high-voltage wire harness with a shielding performance which is low in cost.

According to an aspect of the present invention, there is provided a high-voltage wire harness having a shielding performance, provided in that that portion of the wire harness, corresponding to a first region of an installation path where a cable is not required to have flexibility, comprises rigid wires each having a single conductor, and a metal shielding case covering outer peripheries of the rigid wires; and that portion of the wire harness, corresponding to a second region of the installation path where the cable is required to have flexibility, comprises flexible wires each having a conductor composed of a number of conductor wires, and a flexible shielding member covering outer peripheries of the flexible wires; and the conductors of the rigid wires are connected respectively to the conductors of the flexible wires.

According to another aspect of the present invention, there is provided in that the rigid wire comprises a metal rod serving as the single conductor, and an insulating sheath covering an outer periphery of the metal rod.

According to another aspect of the present invention, there is provided in that there are provided two the second installation path regions where the cable is required to have flexibility, and the two second installation path regions are disposed only at opposite end portions of the installation path, respectively; and the flexible wires, disposed in one of the two second installation path regions, are connected respectively to one ends of the rigid wires, while the flexible wires, disposed in the other second installation path region, are connected respectively to the other ends of the rigid wires; and the flexible shielding members, disposed respectively in the two second installation path regions, are connected respectively to opposite ends of the metal shielding case.

According to another aspect of the present invention, there is provided in that the metal shielding case is a metal protector.

According to another aspect of the present invention, there is provided in that resin protectors are attached respectively to opposite ends of the metal protector, and the flexible shielding members are connected to the metal protector through the respective resin protectors.

According to the aspect of the present invention, the inexpensive rigid wires, each having the single conductor, are employed in the installation path region where the cable is not required to have flexibility, and the rigid wires are covered at their outer peripheries with the metal shielding case, thereby securing the shielding performance. On the other hand, the inexpensive flexible wires are employed in the installation path region where the cable is required to have flexibility, and the flexible wires are covered at their outer peripheries with the expensive flexible shielding member, thereby securing the shielding performance. Thus, the expensive flexible shielding member is used only at the limited region, and therefore the wire harness with the shielding performance can be produced at a low cost.

According to the aspect of the present invention, the rigid wires can be produced at a very low cost, and besides the insulating sheath can prevent the accidental short-circuiting between the adjacent rigid wires.

According to the aspect of the present invention, connectors and terminals are connected to the ends of the flexible wires, and therefore operations for connecting the connectors and the terminals can be carried out efficiently.

According to the aspect of the present invention, the metal protector, protecting the rigid wires, serves also to achieve the shielding performance, and this further reduces the cost. And besides, in the case where the wire harness is installed in a vehicle body, the metal protector is fixed to the vehicle body, and therefore it is not necessary to provide a ground-connecting portion and also to carry out an additional operation for grounding the wire harness to the vehicle body.

According to the aspect of the present invention, the flexible shielding members can be easily and positively connected to the metal protector. And besides, the flexible shielding members are protected by the resin protectors, and therefore an accident, such as the cutting of the wires and damage of the flexible shielding members, can be positively prevented.

DETAILED DESCRIPTION OF THE PREFERRED EMBODIMENTS

One preferred embodiment of the present invention will now be described with reference to the drawings.

Figure 1:
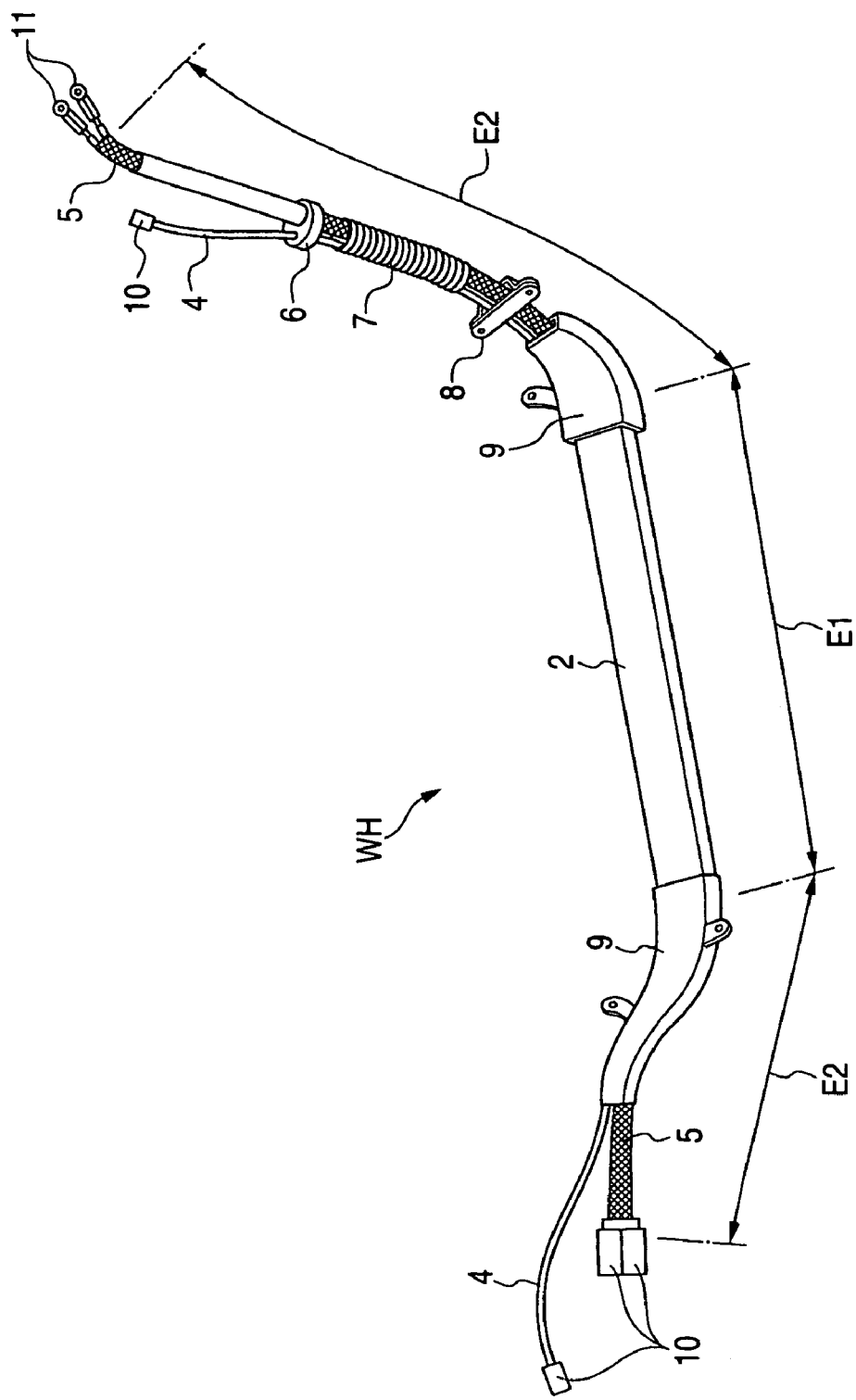
FIG. 1 is a perspective view of one preferred embodiment of a high-voltage wire harness of the present invention, showing its overall construction.
Figure 2:
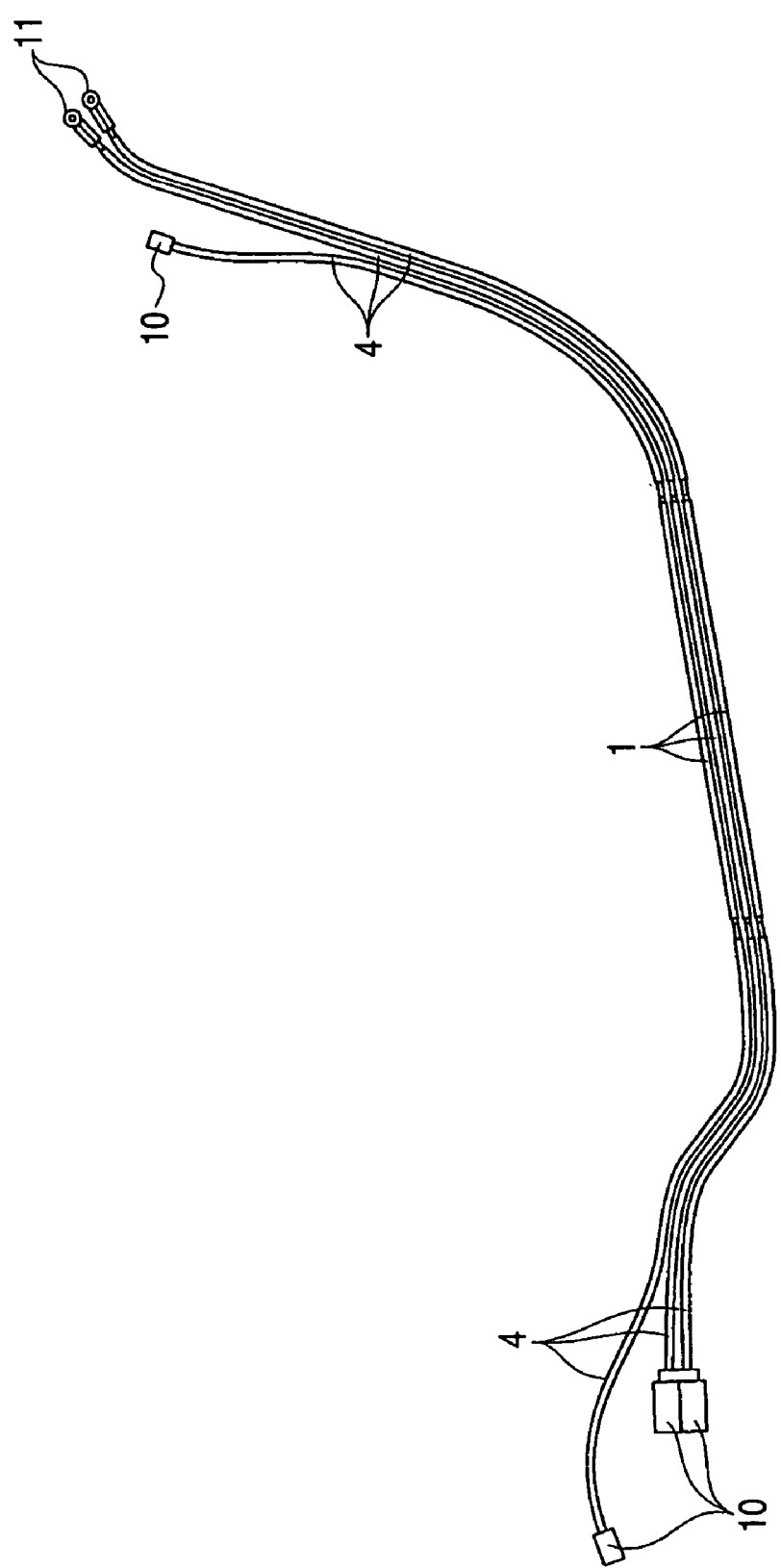
FIG. 2 is a perspective view showing only a group of wires extracted from the high-voltage wire harness of the above embodiment.
Figure 3:
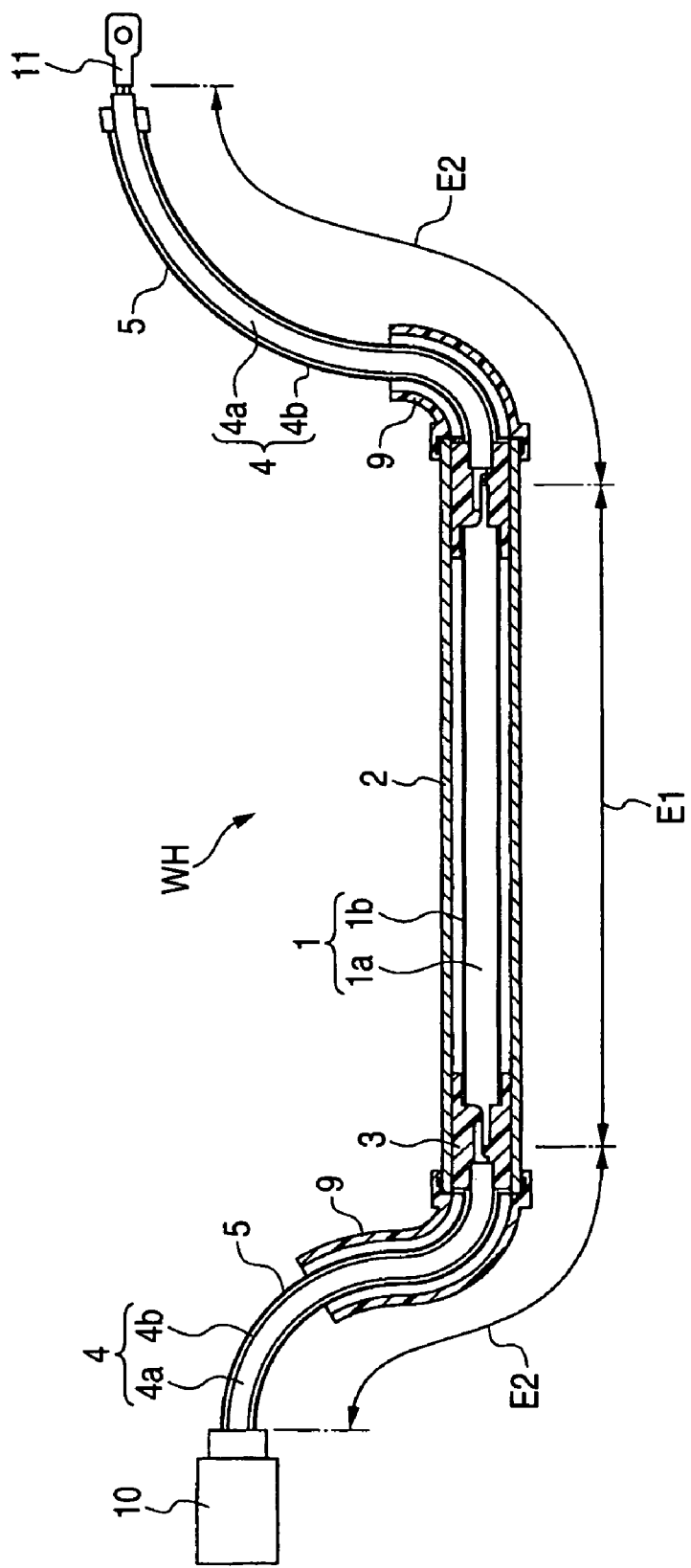
FIG. 3 is a cross-sectional view of the high-voltage wire harness of the above embodiment.
Figure 4:
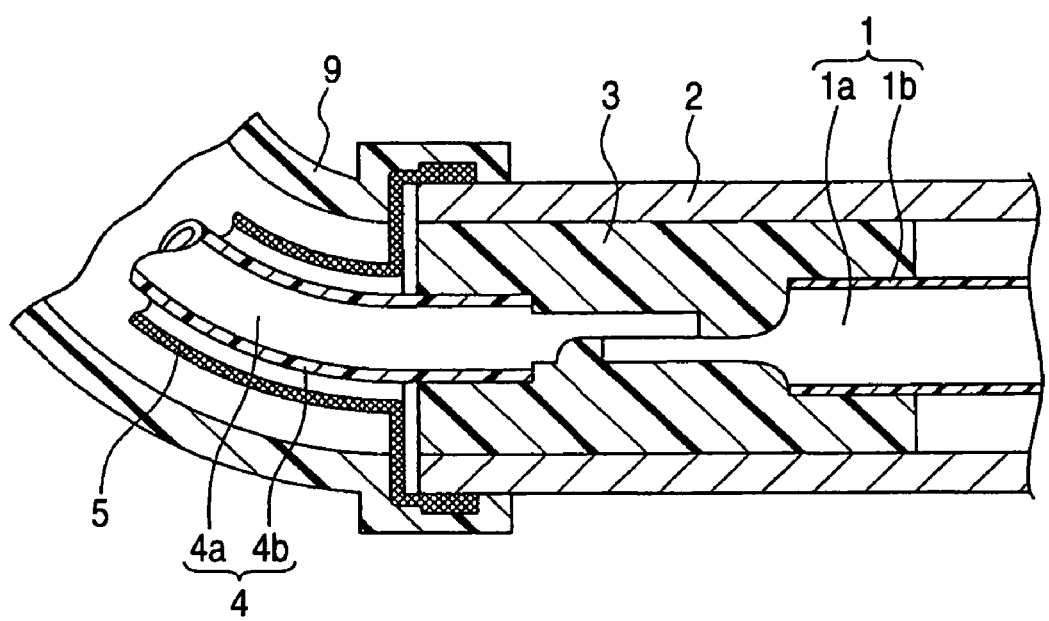
FIG. 4 is an enlarged cross-sectional view showing a portion of connection between a flexibility-necessary region and a flexibility-unnecessary region and its vicinities.
Figure 5:
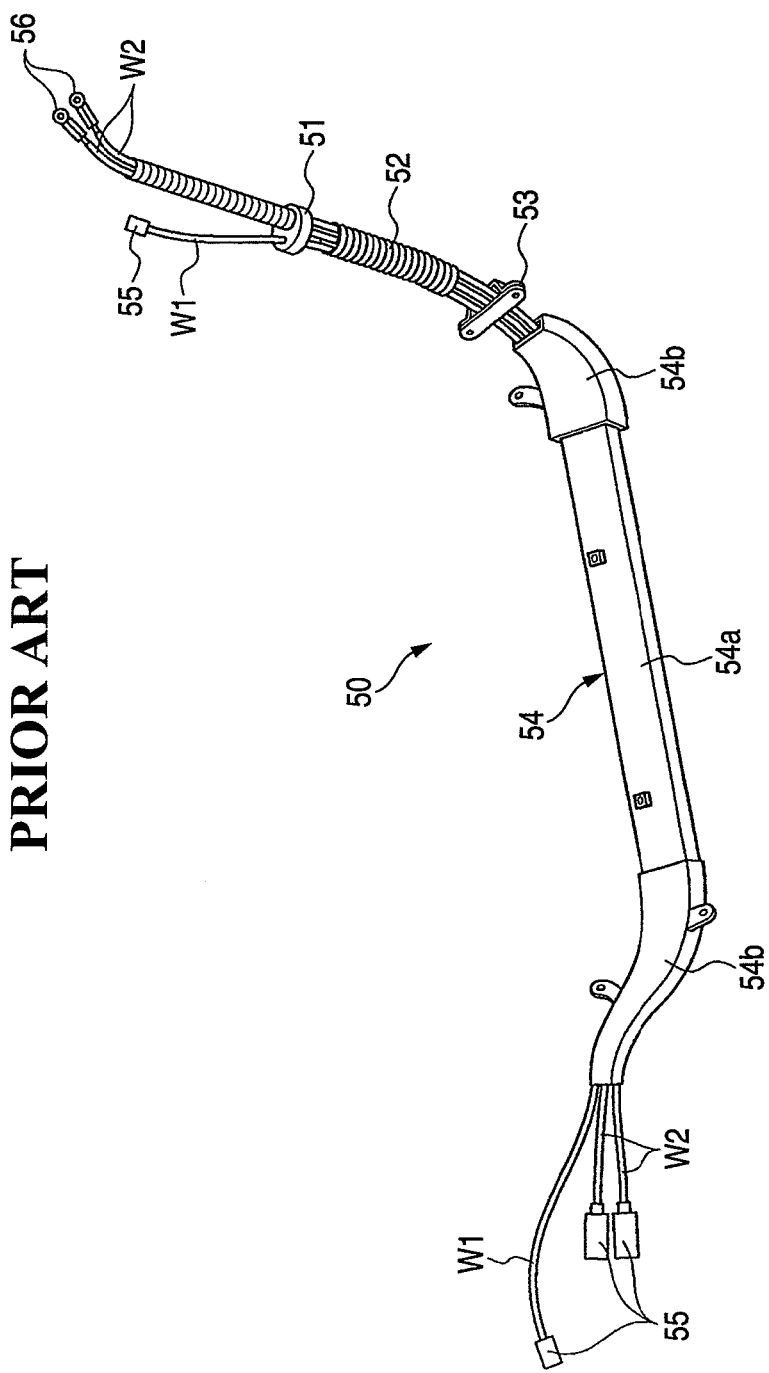
FIG. 5 is a perspective view of a conventional high-voltage wire harness, showing its overall construction.
Figure 6:
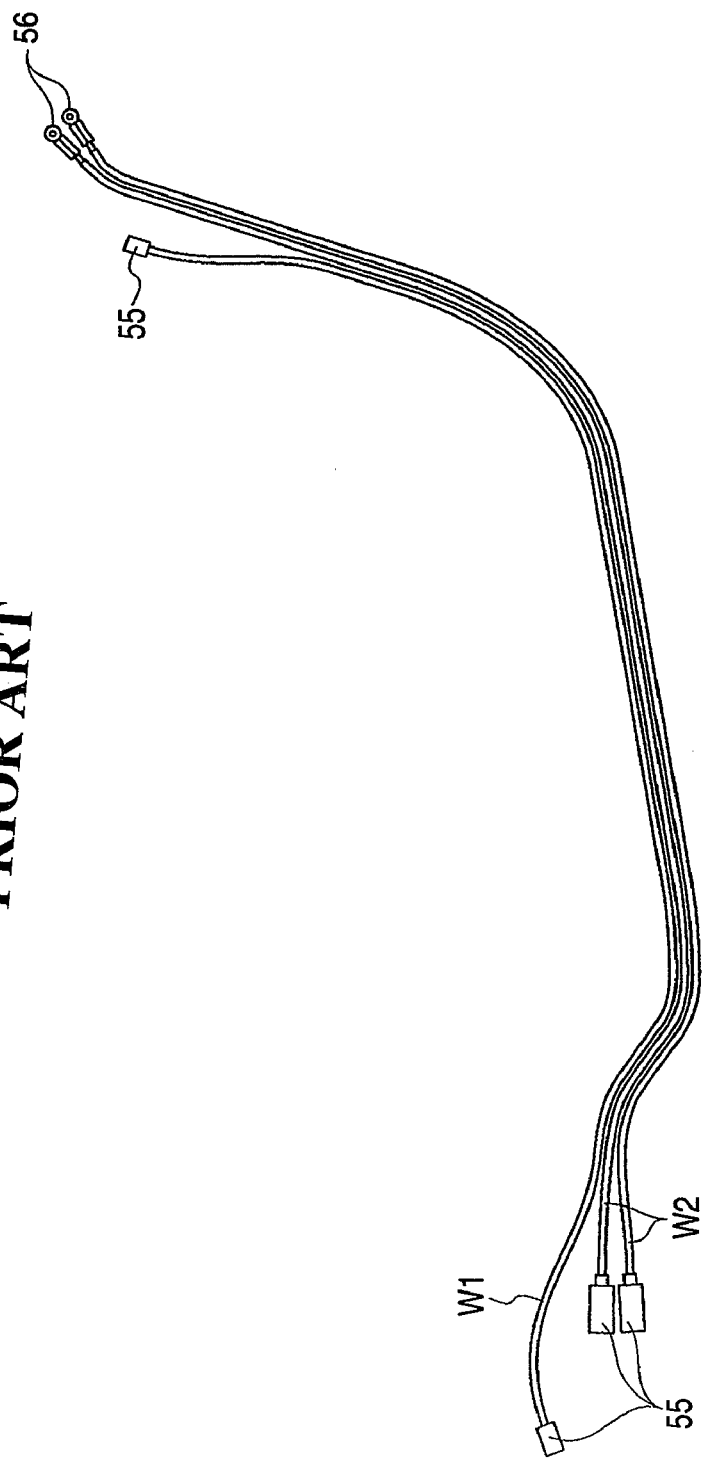
FIG. 6 is a perspective view showing only a group of wires extracted from the conventional high-voltage wire harness.
Figure 7:
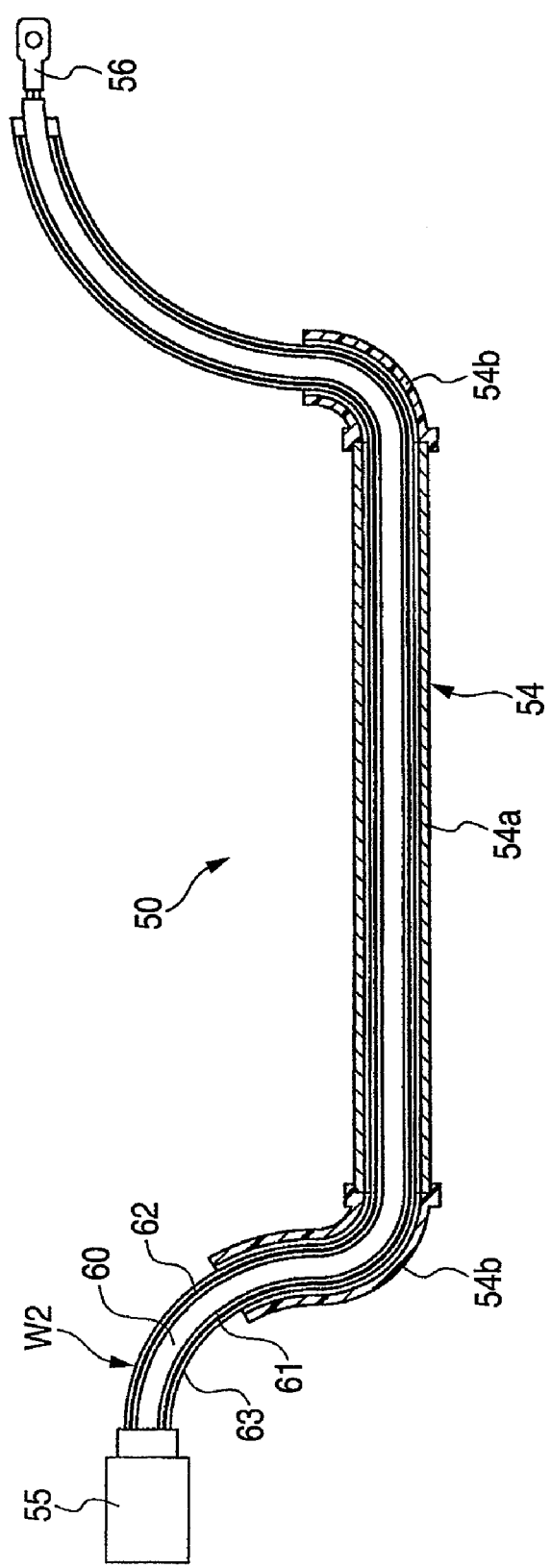
FIG. 7 is a cross-sectional view of the conventional high-voltage wire harness.

As shown in FIG. 1, a path of installation of the high-voltage wire harness WH is divided into a straight installation path region E1 (where a cable is not required to have flexibility) and installation path regions E2 (where the cable is required to have flexibility) disposed respectively at opposite ends of the region E1. That portion of the wire harness WH, corresponding to the central installation path region E1, is fixed to a vehicle body via a metal protector 2, and therefore does not need to have flexibility. Operations for connecting connectors 10 and LA terminals 11 are effected at the installation path regions E2 disposed respectively at the opposite ends of the central installation path region E1, and therefore those portions of the wire harness WH, corresponding respectively to the installation path regions E2, need to have flexibility. The portions of the high-voltage wire harness WH, corresponding to the regions E1 and E2 (which are distinguished from each other according to whether the flexibility is required or not), are formed into different constructions.

Namely, the portion of the wire harness WH, corresponding to the installation path region E1 where the cable is not required to have flexibility, comprises three straight rigid wires 1, and the metal protector 2 (serving as a metal shielding case) covering outer peripheries of the three rigid wires 1.

Each of the rigid wires 1 comprises a metal rod 1a (which is a single thick conductor), and an insulating sheath 1b covering an outer periphery of the metal rod 1a. The insulating sheath 1b are removed from each rigid wire 1 at opposite end portions thereof, thereby exposing the metal rod 1a. Each of the exposed opposite end portions of the metal rod 1a has a generally flat plate-like shape. Conductors 4a of flexible wires 4a (described later) are connected respectively to these flat plate-like portions by soldering or welding.

The metal protector 2 is made of an electrically-conductive material, and has an elongate, flattened rectangular box-shape. An insulative resin is filled in opposite end portions of the metal protector 2 to form resin-sealed portions 3. The end portions of the metal rods 1a of the rigid wires 1 and the end portions of the conductors 4a of the flexible wires 4, connected respectively to these metal rods 1a, are covered with the resin-sealed portion 3. The three rigid wires 1 are fixed in a predetermined position within the metal protector 2 by the resin-sealed portions 3 provided respectively in the opposite end portions of the metal protector 2.

Each of the two portions of the wire harness WH, corresponding respectively to the installation path regions E2 where the cable is required to have flexibility, comprises the three flexible wires 4, and a single flexible shielding member 5 collectively covering outer peripheries of two of the three flexible wires 4. Each of the flexible wires 4 is of the non-shielded type with no shielding layer, and comprises the conductor 4a composed of a number of fine conductor wires twisted together, and an insulating sheath 4b covering an outer periphery of the conductor 4a. As described above, one end portion of the conductor 4a of each flexible wire 4 is connected to the metal rod 1a of the corresponding rigid wire 1. The connector 10 or the LA terminal 11 is connected to the other end of the conductor 4a.

The flexible shielding member 5 comprises a braid (shielding material) formed by weaving metal wires into a tubular shape. An operation for mounting this braid on the flexible wires 4 is carried out after the flexible wires 4 are connected respectively to the rigid wires 1. At the time of fixing resin protectors 9 to the metal protector 2, end portions of the two flexible shielding members 5 are fixed respectively to the opposite end portions of the metal protector 2. As a result, the two flexible shielding members 5, disposed respectively at the opposite ends of the metal protector 2, are electrically connected to the metal protector 2.

A grommet 6, a corrugated tube 7 and a clamp 8 are mounted respectively on predetermined portions of the flexible wires 4 and flexible shielding member 5 extending from one end of the metal protector 2. The pair of resin protectors 9 and 9 are mounted on the opposite end portions of the metal protector 2. Each of the two resin protectors 9 and 9 is formed into a bent configuration corresponding to the desired installation path, and guides the flexible wires 4 and the flexible shielding member 5, disposed within the resin protector 9, along this bent configuration.

As described above, in the high-voltage wire harness WH, the inexpensive rigid wires 1, each having the metal rod 1a, are employed in the installation path region E1 where the cable is not required to have flexibility, and the rigid wires 1 are covered at their outer peripheries with the metal protector 2, thereby securing the shielding performance. On the other hand, the inexpensive flexible wires 4 are employed in the installation path regions E2 where the cable is required to have flexibility, and the flexible wires 4 are covered at their outer peripheries with the expensive flexible shielding member 5, thereby securing the shielding performance. Thus, the expensive flexible shielding members 5 are used only at the limited regions, and therefore the wire harness WH with the shielding performance can be produced at a low cost.

In this embodiment, each of the rigid wires 1 comprises the metal rod 1a (which is the single conductor), and the insulating sheath 1b covering the outer periphery of the metal rod 1a. Therefore, the rigid wires 1 can be produced at a very low cost, and besides the insulating sheath 1b can prevent the accidental short-circuiting between the adjacent rigid wires 1.

In this embodiment, the installation path region E1 where the cable is not required to have flexibility is the central straight installation path region, while the installation path regions E2 where the cable is required to have flexibility are disposed only at the opposite end portions of the overall installation path, respectively. The flexible wires 4 are connected respectively to the opposite ends of each rigid wire 1, and also the flexible shielding members 5 are connected respectively to the opposite ends of the metal protector 2, and therefore the operations for connecting the connectors 10 and the LA terminals 11 can be efficiently effected. And besides, the expensive flexible shielding members 5 are used only at the opposite end portions of the overall installation path, and therefore the wire harness WH for the straight installation path can be produced at a very low cost.

In this embodiment, the metal protector 2 is used as the metal shielding case, and therefore the metal protector 2, protecting the rigid wires 1, serves also to achieve the shielding performance, and this further reduces the cost. And besides, the metal protector 2 is fixed to the vehicle body, and therefore it is not necessary to provide a ground-connecting portion and also to carry out an additional operation for grounding the wire harness to the vehicle body.

In this embodiment, the resin protectors 9 and 9 are connected to the opposite ends of the metal protector 2, respectively, and the flexible shielding members 5 are connected to the metal protector 2 through the respective resin protectors 9. Therefore, the flexible shielding members 5 can be easily and positively connected to the metal protector 2. And besides, the flexible shielding members 5 are protected by the resin protectors 9, respectively, and therefore an accident, such as the cutting of the wires and damage of the flexible shielding members 5, can be positively prevented.

In the above embodiment, the straight installation path region E1 where the cable is not required to have flexibility is disposed at the central portion of the installation path of the high-voltage wire harness WH, and the installation path regions E2 where the cable is required to have flexibility are disposed respectively at the opposite ends of the region E1. However, the arrangement of these installation path regions is not limited to this pattern, and various arrangement patterns can be employed. Although the installation path region E1 where the cable is not required to have flexibility is the straight installation path, this installation path can be formed into other shape than such a straight shape. In this case, the rigid wires 1 and the metal protector 2 are formed into a shape corresponding to such an installation path. Although the flexible shielding member 5 is formed by the braid, this member 5 can be formed by any other suitable material in so far as it can achieve the shielding performance, and for example the flexible shielding member 5 can be formed by a metal sheath, a metal foil or others. Although the wire harness WH includes the three wires each comprising the two flexible wires 4 and the rigid wire 1, the number of the wires can be suitably determined. Although two of the three flexible wires 4 are covered with the flexible shielding member 5, the number of the flexible wires 4 to be covered with the flexible shielding member 5 can be suitably determined.

What is claimed is:

1. A high-voltage wire harness comprising:
    a first region including a first rigid wire having a single conductor, and a metal shielding case covering outer peripheries of the first rigid wire, the metal shielding case corresponding to a metal protector;
    a second region including a second wire having a conductor defined by a plurality of flexible conductor wires, and a flexible shielding member covering outer peripheries of the flexible conductor wires; and
    a resin protector formed into a bent configuration and guiding the flexible conductor wires and the flexible shielding member;
    wherein an end portion of the conductor of the first wire is connected to an end portion of the conductor of the second wire, and wherein said connected end portions are covered and fixed in a predetermined position by a resin-sealed portion located within said metal protector and
    wherein the resin protector and the flexible shielding member do not overlap with said connected end portions.

2. A high-voltage wire harness according to claim 1, wherein the first wire includes a metal rod serving as the single conductor, and an insulating sheath covering an outer periphery of the metal rod.

3. A high-voltage wire harness according to claim 1, wherein the second region consists of at least two second regions which are respectively arranged at opposite end portions of the first region.

4. A high-voltage wire harness according to claim 3, wherein the resin protector consists of at least two resin protectors, said resin protectors attached respectively to opposite ends of the metal protector, and the flexible shielding member of each of the second regions are connected to the metal protector through the respective resin protectors, so that flexible shielding members are provided on the first region so as to be only at the opposite end portions thereof.

* * * * *